United States Patent [19]

Turnbull et al.

[11] 4,425,504

[45] Jan. 10, 1984

[54] BOLOMETRIC DETECTOR

[75] Inventors: Andrew A. Turnbull, Reigate; Raymond F. Hall, Crawley; Colin D. Overall, Reigate, all of England

[73] Assignee: U.S. Philips Corporation, New York, N.Y.

[21] Appl. No.: 281,271

[22] Filed: Jul. 8, 1981

[30] Foreign Application Priority Data

Jul. 16, 1980 [GB] United Kingdom ................. 8023310

[51] Int. Cl.³ .............................................. G01J 1/42
[52] U.S. Cl. ..................................... 250/353; 250/338
[58] Field of Search ....................... 250/338, 353, 342; 374/177, 130

[56] References Cited

U.S. PATENT DOCUMENTS

| | | | |
|---|---|---|---|
| 2,964,636 | 12/1960 | Cary | 250/211 |
| 3,161,772 | 12/1964 | Merlin | 250/338 |
| 3,239,675 | 3/1966 | Morey et al. | 250/338 |
| 3,368,078 | 2/1968 | Flint et al. | 250/353 |
| 3,397,314 | 8/1968 | Weiner | 250/338 |
| 4,024,397 | 5/1977 | Weiner | 250/338 |

OTHER PUBLICATIONS

"Miniature Optically Immersed Thermistor Bolometer Arrays," Russell De Waard et al., Applied Optics, vol. 6, No. 8, Aug. 1967, pp. 1327–1331.
"Optical Immerssion of HgCdTe Photoconductive Dectectors," Joseph E. Slawek, Jr. et al., Infrared Physics, vol. 15, pp. 339–340.

Primary Examiner—Alfred E. Smith
Assistant Examiner—Carolyn E. Fields
Attorney, Agent, or Firm—Marc D. Schechter

[57] ABSTRACT

A bolometric detector comprising an optical immersion lens and a pyroelectric detector element mounted so as to be spaced from the lens. The detector may be mounted spaced from the lens by an air gap, by a foraminous spacer, or by a cement having a low thermal conductivity.

4 Claims, 5 Drawing Figures

U.S. Patent   Jan. 10, 1984   4,425,504
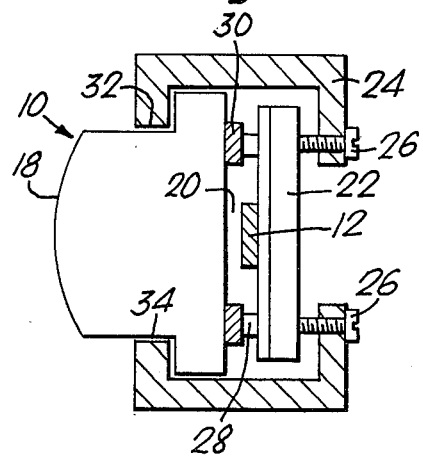
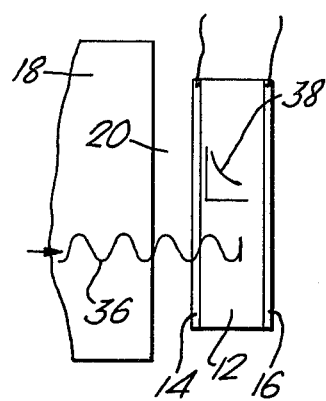
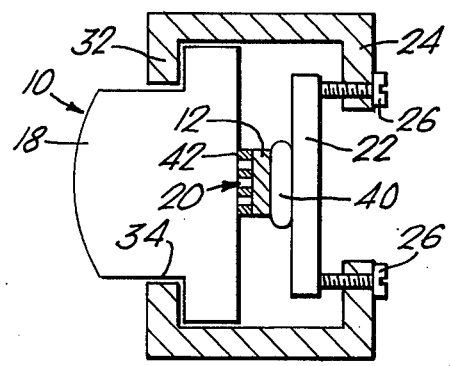
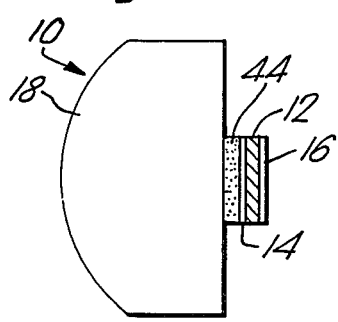
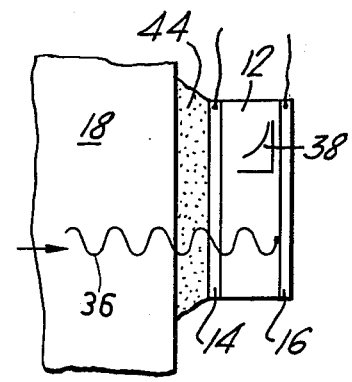

BOLOMETRIC DETECTOR

BACKGROUND OF THE INVENTION

The present invention relates to a bolometric detector, an imaging system including a bolometric detector and a radiation analyzing system provided with a bolometric detector.

For detecting radiation in the range of 8 to 14 microns ($\mu$m) it is known, inter alia, from an article entitled "Miniature Optically Immersed Thermistor Bolometer Arrays" by (R. de Waard and S. Weiner, and published in Applied Optics, August 1967, Vol. 6, No. 8, pages 1327 to 1331), that the optical immersion of a thermistor flake on the plane surface of an optical immersion lens in the form of a germanium hemisphere produces an optical gain of four. That is, the apparent optical size of the thermistor flake is increased by the refractive index times the physical dimensions of the flake. Additionally, in theory the sensitivity of the immersed thermistor flake is approximately four times that of its unimmersed equivalent, since the responsivity of the bolometer increases approximately inversely as the square root of the flake area. However, reflection and absorption losses in the germanium of the hemisphere prevent full realization of this gain and also render the detector response spectrally dependent. A further problem with such a bolometric detector is that the germanium hemisphere acts as a heat sink and consequently the thermistor loses heat and the change in resistance does not relate exactly in the changes in the radiant power incident on the hemispherical surface of the germanium.

It has also been proposed to use optically immersed photoconductive HgCdTe detectors as photon detectors in, for example, a letter to the editor of Infrared Physics ("Optical Immersion of HgCdTe Photoconductive Detectors," Joseph E. Slawek et al, Infrared Physics, 1975, Vol. 15, pages 339 and 340).

Optically immersed photoconductive cells are also disclosed in U.S. Pat. No. 2,964,636.

There has also been an interest in using pyroelectric materials for detecting radiation in the wavelength range of 8 to 14 $\mu$m. However the pyroelectric material, which may be an element of 30 $\mu$m thickness, is difficult to handle and has a low thermal capacity. If it was mounted directly on a plane surface of a germanium hemisphere then its sensitivity would be affected adversely by the heat lost to the germanium, and if it was spaced from the plane surface of the germanium hemisphere to reduce the heat losses, then reflection losses would occur. Also the element is not easy to mount. Because of these problems, as far as is known a bolometric detector using a pyroelectric detector element has not been made so far.

SUMMARY OF THE INVENTION

According to the present invention there is provided a bolometric detector comprising an optical immersion lens and a pyroelectric detector element.

The pyroelectric material of the pyroelectric detector element may be either absorptive or transparent to radiation in the range of wavelengths of interest.

If the material is absorptive, the pyroelectric detector may be spaced, for example by about 0.3 $\mu$m, from the plane surface of a germanium hemisphere acting as the optical immersion lens. The spacing may be achieved in a number of ways. In one embodiment the pyroelectric detector element is bonded to a substrate which is clamped against the plane surface of the hemisphere with spacing means interposed therebetween. In another embodiment a layer of resilient material is disposed between the pyroelectric detector element and a substantially rigid substrate, and a foraminous spacing means is disposed between the pyroelectric detector and the plane surface of the hemisphere. The substrate is then clamped to the hemisphere. The foraminous spacing means may comprise a pattern of dots or a mesh.

If desired, a detector element comprising a radiation absorptive pyroelectric material may be bonded by a cement having a low thermal conductivity, for example a chalcogenide glass of $As_2S_3$, to the plane surface of the germanium hemisphere. The thickness of the cement may be substantially 10 $\mu$m for incident radiation chopped at a frequency of 100 Hz and above.

If the pyroelectric material is transparent to the specified radiation, then the pyroelectric detector element, which is provided with a front electrode which is substantially transparent to the specified radiation and a back electrode which is absorptive of the specified radiation, is bonded by its front electrode to the plane surface of a germanium hemisphere.

If desired the pyroelectric detector element may comprise a plurality of segments, each segment having its own pair of electrodes. An advantage of the pyroelectric detector element comprising a plurality of segments is that the noise equivalent power (NEP), which is approximately proportional to the square root of the elemental area of the pyroelectric material, is smaller and thereby increases the sensitivity of the detector.

BRIEF DESCRIPTION OF THE DRAWINGS

FIG. 1 is a partly schematic, partly cross-sectional view through a first embodiment of a bolometric detector in which the material of the pyroelectric detector element absorbs the incident radiation.

FIG. 2 is an enlarged view of part of FIG. 1.

FIG. 3 is a partly schematic, partly cross-sectional view through a second embodiment of a bolometric detector in which the material of the pyroelectric detector element absorbs the incident radiation.

FIG. 4 is a partly schematic, partly cross-sectional view through a third embodiment of a bolometric detector in which the material of the pyroelectric detector element is transparent to the incident radiation.

FIG. 5 is an enlarged view of part of FIG. 4.

DESCRIPTION OF THE PREFERRED EMBODIMENTS

Referring initially to FIGS. 1 and 2, the bolometric detector 10 comprises a pyroelectric detector element 12 made from a material which absorbs radiation in the wavelength range of interest, for example 8 to 14 $\mu$m. The element 12 has front and back electrodes 14 and 16 (FIG. 2) by which an output signal is derived. The element 12 is mounted in an optically immersed fashion using an optical immersion lens 18 in the form of a germanium hemisphere.

As the pyroelectric detector element 12 operates by producing an output signal in response to the heating of material of the element 12 by absorbing the incident energy, it is important that heat losses to the leans 18, which acts as a heat sink, should be avoided. However, at the same time it is necessary to maintain optical contact to ensure an adequate sensitivity. One way of mounting the pyroelectric detector element 12 which endeavours to compromise between these two opposing considerations is to space the element 12 from the plane surface of the hemispherical lens 18. In determining the size of an air gap 20 one has to take account of the adverse effect of reflections occurring between the plane surface of the lens 18 and the transparent front electrode 14. It can be determined from a consideration of the curves of ratio of performance with losses to performance without losses against heat loss and against reflective losses that an air gap 20 of 0.3 $\mu$m is a reasonable compromise for incident radiation having a wavelength in the range 8 to 14 $\mu$m, the radiation being chopped at a frequency 100 Hz or greater.

As the element 12 is on the order of 30 $\mu$m thick and 4 mm square, it is difficult to handle. Furthermore, as the pyroelectric material, which is the present embodiment may be lithium tantalate ($LiTaO_3$), exhibits piezoelectric properties it is necessary to avoid stresses which will produce stray signals.

In the embodiment of FIG. 1 the element 12 is cemented to a glass substrate 22 having the same coefficient of expansion as the material of the element 12. In mounting the element 12 on the substrate 22 care has to be taken to avoid producing unnecessary stresses in the element 12. The substrate 22 is clamped by a clamp 24 having a plurality of adjusting screws 26 against the hemispherical lens 18. In order to ensure that an air gap 20 is maintained, spacing means are provided. The spacing means comprises a spacer 28 having the same thickness as the pyroelectric detector element 12, and a spacer 30 having a thickness corresponding to the air gap 20. The clamp 24 is provided with a lip 32 which abuts against a portion 34 of the hemispherical surface of the element 18. The portion 34 is out of the field of view of the incident radiation and consequently the clamp 24 does not adversely affect the operation of the detector.

The thickness of the element 12 is determined by the intended application of the bolometric detector 10. Generally the incident radiation is chopped and the frequency of chopping determines the heat attenuation characteristics of the pyroelectric detector element. The lower the chopping frequency, the slower the heat attenuation and conversely the higher the chopping frequency, the faster the heat attenuation.

For the purpose of illustrating the operation of the pyroelectric detector element 12, radiation 36 (FIG. 2) passes through the hemispherical lens 18 which concentrates the radiation, crosses the air gap 20 and is absorbed by the body of the element 12 causing heat to be produced which is attenuated as shown by the heat loss curve 38. The heating of the pyroelectric material of the element 12 causes a change in its polarization which is detected across the electrodes 14 and 16.

FIG. 3 represents another technique for optically immersing a pyroelectric detector element 12 which absorbs radiation. In the interest of brevity, only the differences between the method of mounting the pyroelectric detector element 12 will be described. As in FIG. 1 a clamping technique is used. In order that a flat, rigid substrate 22 can be made to apply a uniform pressure to the element 12, a layer 40 of a silicone rubber is sandwiched between the detector 12 and the substrate 22. The layer 40 of silicone rubber is capable of absorbing the dimensional changes of the element 12 due to heating without applying any undesired stresses which would cause the element 12 to produce stray signals. The substrate 22 is clamped against the lens 18 by a similar arrangement as described and shown in FIG. 1. In order to maintain an air gap 20 of the desired thickness, say about 0.3 $\mu$m, a foraminous spacer 42 is provided. The spacer 42 may comprise a mesh or a dot pattern.

FIGS. 4 and 5 illustrate an embodiment in which the pyroelectric material of the element 12, which material may comprise PLMZT (lead zirconate tantalate, doped with lanthanum and manganese), is transparent to the incident radiation.

The bolometric detector 10 comprises an optical immersion lens 18 in the form of a germanium hemisphere. The element 12 is bonded to the plane surface of lens 18 by a cement 44 having a low thermal conductivity and which is substantially transparent to the incident radiation. The cement 44 may comprise silver chloride or a chalcogenide glass ($As_2Se_3$ or $As_2S_3$). The element 12 has a front electrode 14 which is substantially transparent to the radiation of the specified wavelength and a back electrode 16 which is absorptive to the radiation 36 of the specified wavelength which has passed largely unattenuated through the pyroelectric material of the element 12.

As shown in FIG. 5, the radiation is absorbed by the back electrode 16 causing heat to be produced. The attenuation of the heat diffusing in the opposite direction is illustrated by the heat loss curve 38.

The arrangement shown in FIG. 4 can be used with an element 12 having a pyroelectric material which absorbs the incident radiation. However, as explained, care has to be taken to minimize heat loss from the element 12 to the hemispherical lens 18 while at the same time maintaining the sensitivity of the element 12. These objectives can be achieved by suitably selecting the thickness of the low thermal-conductivity cement 44. In the case of using the chalcogenide glass $As_2S_3$ or silver chloride, the thickness may be, for example, 10 $\mu$m for a chopping frequency of 100 Hz and above.

If desired the element 12 may comprise a plurality of segments, e.g. five segments, each one having its own electrodes. Such a segmented arrangement has the advantage that the noise equivalent power (NEP), which is approximately proportional to the square root of the area of the segment, is smaller than will be the case with a nonsegmented element 12. Generally one electrode of each segment is common to all the segments.

Although in FIG. 4 a germanium hemisphere has been used as the optical immersion lens 18, a germanium catadioptric lens may be used as the final lens element instead.

We claim:

1. A bolometric detector for detecting radiation of a specified wavelength range comprising:
   an optical immersion lens having a plane surface;
   a substantially rigid substrate;
   means for clamping the substrate to the lens;
   a pyroelectric detector element, mounted on the substrate by way of a layer of resilient material disposed between the detector element and the substrate, said detector element being disposed between the plane surface of the lens and the substrate; and
   foraminous spacing means disposed between the pyroelectric detector element and the plane surface of the lens.

2. A bolometric detector as claimed in claim 1, characterized in that the immersion lens is a germanium hemisphere.

3. A bolometric detector as claimed in claim 2, characterized in that the pyroelectric detector element comprises a material which absorbs radiation of the specified wavelength range.

4. A bolometric detector as claimed in claim 3, characterized in that the foraminous spacing means is approximately 0.3 microns so as to space the detector element approximately 0.3 microns from the plane surface of the lens.

* * * * *